(12) United States Patent
Sheridan

(10) Patent No.: US 10,590,854 B2
(45) Date of Patent: Mar. 17, 2020

(54) GEARED GAS TURBINE ENGINE

(71) Applicant: United Technologies Corporation, Farmington, CT (US)

(72) Inventor: William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 731 days.

(21) Appl. No.: 15/006,474

(22) Filed: Jan. 26, 2016

(65) Prior Publication Data

US 2017/0211484 A1 Jul. 27, 2017

(51) Int. Cl.
| | |
|---|---|
| *F02C 3/10* | (2006.01) |
| *F02C 7/36* | (2006.01) |
| *F02C 3/04* | (2006.01) |
| *F02C 3/00* | (2006.01) |

(52) U.S. Cl.
CPC .................. *F02C 7/36* (2013.01); *F02C 3/00* (2013.01); *F02C 3/04* (2013.01); *F02C 3/103* (2013.01); *F05D 2260/40311* (2013.01)

(58) Field of Classification Search
CPC .... F02C 7/32; F02C 7/36; F02C 3/107; F02C 3/103; F05D 2260/40311; B64D 2027/005
See application file for complete search history.

(56) References Cited

U.S. PATENT DOCUMENTS

| | | | |
|---|---|---|---|
| 2,770,946 A | 11/1956 | Savin, Jr. | |
| 3,357,176 A | 12/1967 | Williams | |
| 5,163,286 A | 11/1992 | Jaw | |
| 5,483,791 A | 1/1996 | Kotwal et al. | |
| 6,082,967 A | 7/2000 | Loisy | |
| 6,302,356 B1 | 10/2001 | Hawkins | |
| 6,364,249 B1 | 4/2002 | Morgan et al. | |
| 6,488,469 B1 * | 12/2002 | Youssef | F02C 3/08 415/143 |
| 6,735,954 B2 | 5/2004 | MacFarlane et al. | |
| 7,552,591 B2 | 6/2009 | Bart et al. | |
| 8,297,916 B1 * | 10/2012 | McCune | F01D 25/164 415/124.1 |
| 8,459,038 B1 | 6/2013 | Lickfold et al. | |
| 8,572,943 B1 * | 11/2013 | Sheridan | F02C 7/06 60/39.08 |
| 9,840,969 B2 * | 12/2017 | Sheridan | F02C 7/36 |
| 9,863,326 B2 * | 1/2018 | Sheridan | F02C 7/36 |
| 2003/0115885 A1 * | 6/2003 | MacFarlane | F02C 6/206 60/793 |

(Continued)

OTHER PUBLICATIONS

"Rolls Royce Tyne developed during the 1950's" from Wikipedia, the free encyclopedia; (Year: 2019).*

(Continued)

*Primary Examiner* — William H Rodriguez

(74) *Attorney, Agent, or Firm* — Carlson, Gaskey & Olds, P.C.

(57) ABSTRACT

A turboshaft engine includes a high speed spool that connects a high pressure compressor with a high pressure turbine. A low speed spool connects a low pressure compressor with a low pressure turbine. A speed change mechanism includes an input that is in communication with the low spool and a fixed gear ratio. An output turboshaft is in communication with an output of the speed change mechanism.

20 Claims, 2 Drawing Sheets

(56) References Cited

U.S. PATENT DOCUMENTS

| | | | |
|---|---|---|---|
| 2005/0132693 A1 | 6/2005 | Macfarlane et al. | |
| 2012/0171018 A1 | 7/2012 | Hasel et al. | |
| 2014/0196473 A1* | 7/2014 | Kupratis | F02C 7/36 60/805 |
| 2015/0285155 A1 | 10/2015 | Sheridan et al. | |
| 2015/0308351 A1* | 10/2015 | Sheridan | F02C 7/36 60/39.08 |
| 2015/0377143 A1* | 12/2015 | Sheridan | F02C 7/36 415/124.1 |
| 2016/0363047 A1* | 12/2016 | Schwarz | F01D 5/14 |
| 2017/0009776 A1* | 1/2017 | Gomanne | F01D 25/20 |
| 2017/0096937 A1* | 4/2017 | Sheridan | F02C 7/36 |
| 2017/0096943 A1* | 4/2017 | Sheridan | F02C 7/36 |
| 2017/0096944 A1* | 4/2017 | Sheridan | F02C 7/36 |
| 2017/0159608 A1* | 6/2017 | Ertas | F02K 3/06 |
| 2017/0260911 A1* | 9/2017 | Sheridan | F02C 7/36 |

OTHER PUBLICATIONS

The Extended European Search Report for EP Application No. 17150356.8, dated Jun. 9, 2017.

* cited by examiner

GEARED GAS TURBINE ENGINE

BACKGROUND

A gas turbine engine typically includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor section. In the case of a turboshaft engine, the engine drives an output shaft to create shaft power instead of thrust. The output shaft may be used to drive devices, such as a rotary wing aircraft, a generator, or a vehicle. There is an increasing desire to improve the power output and fuel efficiency of these engines to extend operating distances for rotary wing aircraft or vehicles and to reduce costs associated with fuel and maintenance.

SUMMARY

In one exemplary embodiment, a turboshaft engine includes a high speed spool that connects a high pressure compressor with a high pressure turbine. A low speed spool connects a low pressure compressor with a low pressure turbine. A speed change mechanism includes an input that is in communication with the low spool and a fixed gear ratio. An output turboshaft is in communication with an output of the speed change mechanism.

In a further embodiment of the above, there is a bypass ratio of zero.

In a further embodiment of any of the above, the speed change mechanism is an epicyclic gear train with a constant gear ratio.

In a further embodiment of any of the above, the epicyclic gear train is a star gear system. The output is fixed to a ring gear and a carrier is fixed from rotation relative to an engine static structure with a gear ratio of about 1.5 to about 2.5.

In a further embodiment of any of the above, the epicyclic gear train is a planet gear system. The output is fixed to a carrier and a ring gear is fixed from rotation relative to an engine static structure with a gear ratio of about 2.5 to about 4.0.

In a further embodiment of any of the above, the speed change mechanism is non-epicyclic and includes a gear ratio of about 1.5 to about 2.5.

In a further embodiment of any of the above, an axis of rotation of the output driveshaft is offset from an axis of rotation of the low speed spool.

In a further embodiment of any of the above, the axis of rotation of the output driveshaft is transverse to the axis of rotation of the low speed spool.

In a further embodiment of any of the above, the low pressure compressor includes a pressure ratio of greater than about 1.5 and less than about 6.0. The high pressure compressor includes a pressure ratio of greater than about 4.0 and less than about 10.0.

In a further embodiment of any of the above, a pressure ratio of the low pressure compressor is greater than about 20 and less than about 40.

In a further embodiment of any of the above, the low speed spool is supported by no more than two bearing systems and the high speed spool is supported by no more than two bearing systems.

In a further embodiment of any of the above, the low speed spool and the high speed spool are supported by at least four bearing systems and no more than ten bearing systems.

In a further embodiment of any of the above, the low pressure turbine includes at least one rotor stage and less than four rotor stages.

In one exemplary embodiment, a method of operating a gas turbine engine includes the steps of rotating a high speed spool including a high pressure compressor and a high pressure turbine at between about 48,000 rpms and about 50,000 rpms. A low speed spool is rotated and includes a low pressure compressor and a low pressure turbine at about 40,000 rpms. The rotational speed of the low speed spool is reduced by a ratio of about 1.5 to about 4.0 with a speed change mechanism. An input of the speed change mechanism is attached to the low speed spool and rotates an output driveshaft with an output of the speed change at a reduced rotational speed.

In a further embodiment of any of the above, the gas turbine engine includes a bypass ratio of zero.

In a further embodiment of any of the above, the speed change mechanism is a star gear system. The output turboshaft is fixed to a ring gear and a carrier is fixed from rotation relative to an engine static structure with a gear ratio of about 1.5 to about 2.5.

In a further embodiment of any of the above, the speed change mechanism is a planet gear system and the output turboshaft is fixed to carrier and a ring gear is fixed from rotation relative to an engine static structure with a gear ratio of about 2.5 to 4.0.

In a further embodiment of any of the above, the speed change mechanism is non-epicyclic and includes a gear ratio of about 1.5 to about 2.5.

In a further embodiment of any of the above, the low pressure compressor includes a pressure ratio of greater than about 1.5 and less than about 6.0. The high pressure compressor includes a pressure ratio of greater than about 4.0 and less than about 10.0.

In a further embodiment of any of the above, a pressure ratio of the low pressure compressor is greater than about 20 and less than about 40.

DETAILED DESCRIPTION

Figure 1:
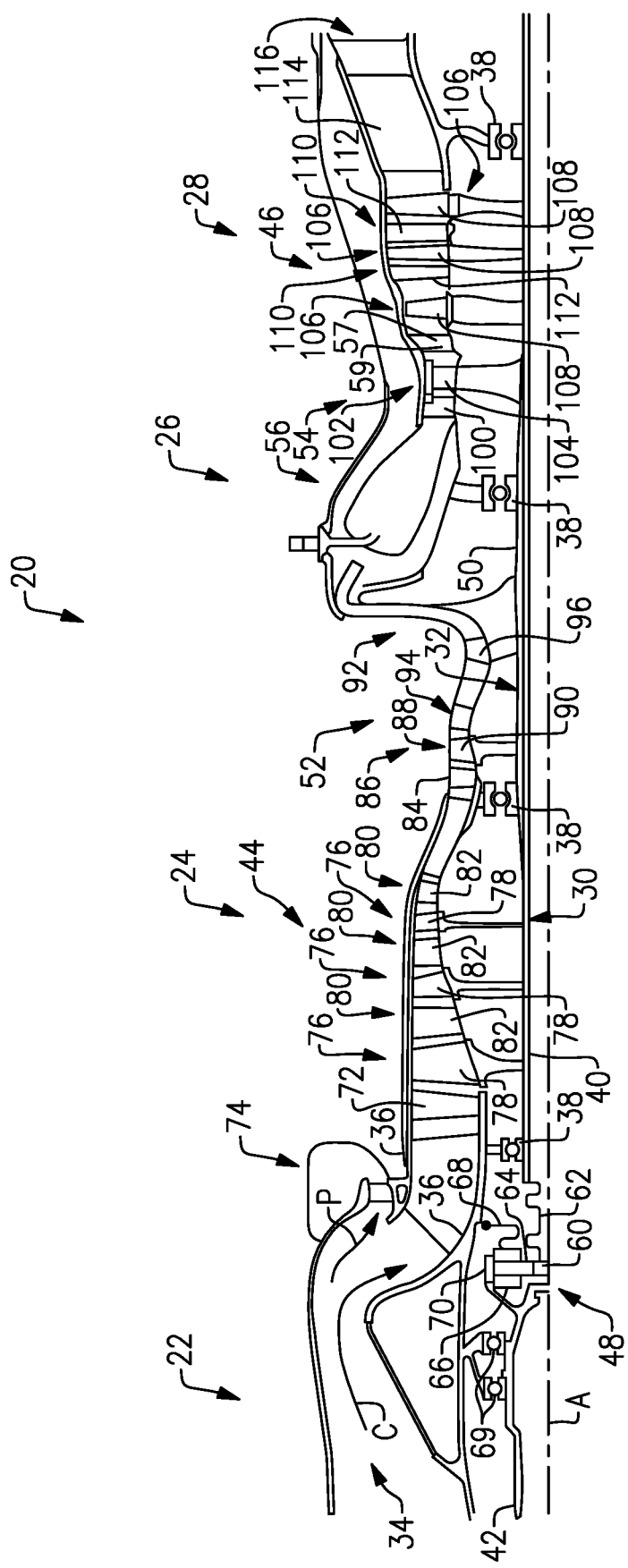
FIG. 1 is a schematic view of an example gas turbine engine according to a non-limiting embodiment.

FIG. 1 schematically illustrates a gas turbine engine 20 according to a first non-limiting embodiment. The gas turbine engine 20 is disclosed herein as a two-spool turboshaft engine that generally incorporates an intake section 22, a compressor section 24, a combustor section 26, and a turbine section 28. The intake section 22 accepts air into an intake 34 and drives the air along a core flow path C into the compressor section 24 for compression and communication into the combustor section 26 then expansion through the turbine section 28.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

In one non-limiting embodiment, the low speed spool 30 and the high speed spool 32 are each supported by two separate bearing systems 38. In another non-limiting embodiment, the low speed spool 30 and the high speed spool 32 are supported by a total of at least four (4) bearing systems 38 and no more than ten (10) bearing systems 38. Furthermore, although the bearing systems 38 are depicted as ball bearings in the illustrated embodiment, other bearings, such as thrust bearings, roller bearings, journal bearings, or tapered bearings could be used to support the low speed spool 30 and the high speed spool 32.

The low speed spool 30 generally includes an inner shaft 40 that interconnects a first (or low) pressure compressor 44 and a first (or low) pressure turbine 46. The inner shaft 40 is connected to an output driveshaft 42 through a speed change mechanism, which in exemplary gas turbine engine 20 is illustrated as a geared architecture 48, to turn the output driveshaft 42 at a lower rotational speed than the low speed spool 30. The output driveshaft 42 is located on an axially forward end of the gas turbine engine 20 opposite the turbine section 28. In another non-limiting embodiment, the output driveshaft 42 is located at an axially downstream end of the gas turbine engine 20. In this disclosure, axial or axially is in relation to the axis A unless stated otherwise.

The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The inner shaft 40 and the outer shaft 50 are concentric and rotate via bearing systems 38 about the engine central longitudinal axis A which is collinear with their longitudinal axes. In a non-limiting embodiment, the output driveshaft 42 may also rotate about the axis A. One of the bearing systems 38 may be located forward or aft of the high pressure turbine 54 such that one of the bearing systems 38 is associated with the mid-turbine frame 57.

Due to the environment in which the gas turbine engine 20 may be operating, there is a need to separate particles, such as sand, dirt, or other debris, from the core flow path C entering the gas turbine engine 20. Particles entering the intake 34 traveling through the core flow path C are separated into a particle stream P that enters a particle separator 74 on a radially outer side of the core flow path C. The particle stream P is formed due to the geometry of the intake 34. The intake 34 includes a component in the radially outer direction upstream of a portion with a component in a radially inward direction. This change in direction forces the particles against a radially outer surface of the intake 34 and into the particle separator 74 while the majority of the air is able to continue into the low pressure compressor 44 along the core flow path C. In this disclosure, radial or radially is in relation to the axis A unless stated otherwise.

The core flow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the intake section 22, compressor section 24, combustor section 26, turbine section 28, and geared architecture 48 may be varied. For example, geared architecture 48 may be located aft of combustor section 26 or even aft of turbine section 28.

In the illustrated embodiment, the gas turbine engine 20 is a zero bypass engine, such that the gas turbine engine 20 includes a bypass ratio of zero because the gas turbine engine 20 includes the core flow path C without having a bypass duct forming a flow path surrounding the gas turbine engine 20.

According to one non-limiting embodiment, the geared architecture 48 is an epicyclic gear train, such as a star gear system or a planet gear system, with a gear reduction ratio of greater than about 1.5 and less than about 4.0. The output rotational speed of the epicyclic gear train would be fixed relative to the rotational speed of the low speed spool 30 such that a rotational speed of the output driveshaft 42 would vary with the rotational speed of the low speed spool 30 by a fixed gear ratio in the epicyclic gear train.

Figure 2:
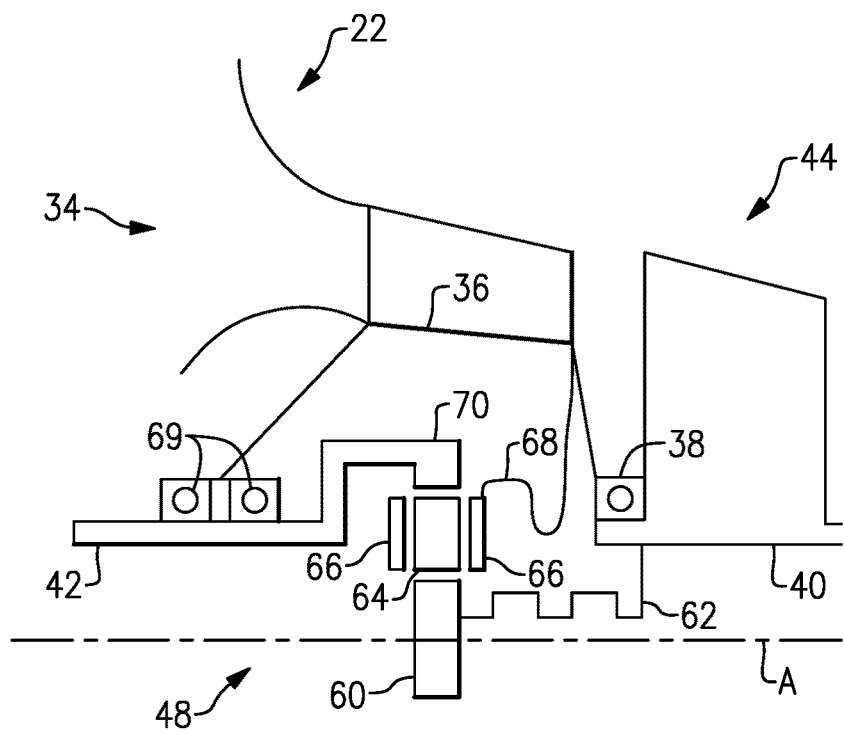
FIG. 2 is a schematic view of a geared architecture according to a first non-limiting embodiment.

As shown in the non-limiting embodiments of FIG. 2, the geared architecture 48 may be a star gear system with a gear ratio of about 1.5 to about 2.5. The star gear system includes a sun gear 60 mechanically attached to the inner shaft 40 with a sun gear flexible coupling 62 and a plurality of star gears 64 surrounding the sun gear 60 supported by a carrier 66. The carrier 66 is fixed from rotation relative to the engine static structure 36 with a carrier flexible coupling 68. A ring gear 70 is located radially outward from the carrier 66 and the star gears 64. The ring gear 70 is attached to the output driveshaft 42, which is supported by drive shaft bearings 69, such as roller or ball bearings. The sun gear flexible coupling 62 and the carrier flexible coupling 68 provide flexibility into the star gear system to accommodate for any misalignment during operation. Because the geared architecture 48 is a star gear system, the inner shaft 40 and the output driveshaft 42, rotate in opposite rotational directions.

Figure 3:
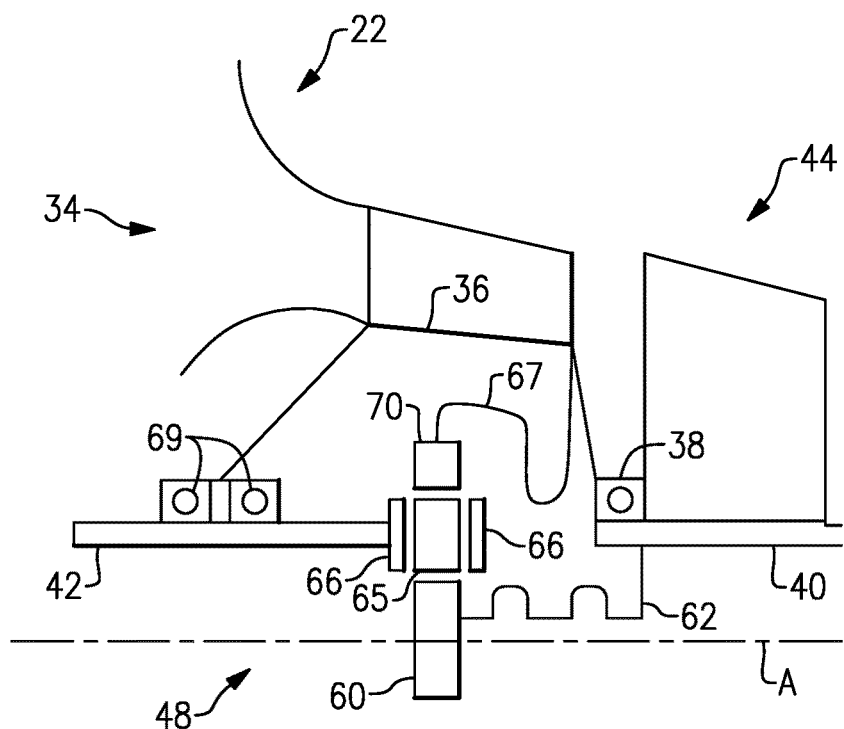
FIG. 3 is a schematic view of a geared architecture according to a second non-limiting embodiment.

In another non-limiting embodiment shown in FIG. 3, the geared architecture 48 may be a planet gear system with a gear ratio of 2.5 to about 4.0. The planet gear system is similar to the star gear system of FIGS. 1 and 2 except where described below or shown in FIG. 3. The planet gear system includes the sun gear 60 mechanically attached to the inner shaft 40 with the sun gear flexible coupling 62 and planet gears 65 surrounding the sun gear 60. The planet gears 65 are supported by the carrier 66. The carrier 66 is allowed to rotate relative to the engine static structure 36. The carrier 66 drives the output driveshaft 42. The ring gear 70 is located radially outward from the carrier 66 and the planet gears 65 and is fixed from rotation relative to the engine static structure 36 with a ring gear flexible coupling 67. The sun gear flexible coupling 62 and the ring gear flexible coupling 67 provide flexibility into the planet gear system to accommodate for any misalignment during operation. Because the geared architecture 48 is a planet gear system, the inner shaft 40 and the output driveshaft 42, rotate in the same rotational direction.

Alternatively, the geared architecture 48 could be a non-epicyclic gear system including helical, spur, or bevel gears to create a gear reduction ration of greater than about 1.5 and less than about 2.5. The output rotational speed of the non-epicyclic gear system would be fixed relative to the rotational speed of the low speed spool 30 such that a rotational speed of the output driveshaft 42 would vary with the rotational speed of the low speed spool 30 by a fixed gear ratio in the non-epicyclic gear system. Furthermore, with the use of a non-epicyclic gear system, an axis of the output driveshaft 42 could be offset from the engine axis A or be transverse to the engine axis A. The offset or transverse axis of the output driveshaft 42 relative to the engine axis A will depend on the packaging requirements for the specific application. However, the flexibility of varying the axis of the output driveshaft 42 will allow the gas turbine engine 20 to be utilized in a wide variety of applications. The output driveshaft 42 could also drive an additional gear train or transmission that would provide a greater range of output orientations.

In the illustrated non-limiting embodiment shown in FIG. 1, the low pressure compressor 44 includes an array of inlet guide vanes 72 directing air from the intake 34 in the intake section 22 past multiple rotor stages 76 each including an array of rotor blades 78. The rotor stages 76 are separated by stators 80 each including an array of vanes 82. The vanes 82 could be variable pitch or fixed from rotating about an axis. In the illustrated non-limiting embodiment, the low pressure compressor 44 includes three rotor stages 76 and three stators 80 and includes a pressure ratio between about 1.5 and about 6.0. In this disclosure, about equates to within ten (10) percent of the stated value unless stated otherwise.

The high pressure compressor 52 includes an array of inlet guide vanes 84 axially upstream of a first axial compressor stage 86. The first axial compressor stage 86 includes an axial stage rotor 88 having an array of rotor blades 90. A centrifugal compressor stage 92 is located downstream and separated from the axial compressor stage 86 by an array of vanes 94. The centrifugal compressor stage 92 includes an array of blades 96 that direct compressed air downstream and radially outward and toward the combustor section 26. The high pressure compressor 52 generates a pressure ratio between about 4.0 and about 10.0. This allows the overall pressure ratio of the compressor section 24 to be greater than about 20 and less than about 40. However, the overall pressure ratio of the compressor section 24 could reach 60.

The high pressure turbine 54 includes an array of inlet guide vanes 100 that direct the core flow path C past a single rotor stage 102 having an array of rotor blades 104 upstream of the airfoils 59 on the mid-turbine frame 57.

Furthermore, in the illustrated non-limiting embodiment, the low pressure turbine 46 includes three rotor stages 106 each including an array of rotor blades 108. Each of the rotor stages 108 are separated by stators 110 having an array of vanes 112. The vanes 112 could be variable vanes or fixed from rotation about an axis. In another non-limiting embodiment, the low pressure turbine 46 includes at least one rotor stage 106 and less than four rotor stages 106. An outlet vane 114 is located downstream of the low pressure turbine 46 and directs the core flow path C out of an exhaust nozzle 116.

It should be understood, however, that the above parameters are only exemplary of one embodiment of a geared architecture engine and that the present invention is applicable to other gas turbine engines.

During operation of the gas turbine engine 20, the high speed spool 32 rotates at a maximum rotation speed of about 48,000 rpms to about 50,000 rpms while the low speed spool operates a rotational speed of about 40,000 rpms. Because the rotational speed of about 40,000 rpms of the low speed spool is generally much higher than is desired during operation, the input to the geared architecture 48 is coupled to the low speed spool 30 to reduce the rotation speed of the low speed spool by a ratio of about 1.5 to about 4.0 at an output of the geared architecture 48 to drive the output driveshaft 42.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turboshaft engine comprising:
    a high speed spool connecting a high pressure centrifugal compressor with a high pressure turbine;
    a low speed spool connecting a low pressure compressor with a low pressure turbine, wherein the low speed spool rotates around a central turboshaft engine rotational axis;
    an epicyclic gear train including an input fixed to rotate with the low spool, wherein the epicyclic gear train is a star gear system and includes a carrier is fixed from rotation relative to an engine static structure with a flexible support and a fixed gear ratio of between 1.5 to 2.5; and
    an output turboshaft fixed to rotate with a ring gear of the epicyclic gear train, wherein the turboshaft engine includes a bypass ratio of zero, the output turboshaft rotates around a central output turboshaft rotational axis, the central output turboshaft rotational axis is centered and parallel with the central turboshaft engine rotational axis, and an outermost duct of the turboshaft engine is defined by a core airflow path.

2. The turboshaft engine of claim 1, wherein the low pressure compressor includes a pressure ratio of greater than 1.5 and less than 6.0 and the high pressure centrifugal compressor includes a pressure ratio of greater than 4.0 and less than 10.0.

3. The turboshaft engine of claim 2, wherein an overall pressure ratio of the high pressure centrifugal compressor and the low pressure compressor is greater than 20 and less than 40.

4. The turboshaft engine of claim 1, wherein the low speed spool is supported by no more than two bearing systems and the high speed spool is supported by no more than two bearing systems.

5. The turboshaft engine of claim 1, wherein the low speed spool and the high speed spool are supported by at least four bearing systems and no more than ten bearing systems.

6. The turboshaft engine of claim 1, wherein the low pressure turbine includes at least one rotor stage and less than four rotor stages.

7. The turboshaft engine of claim 1, wherein an intake to a core airflow path is located axially forward of a pair of output turboshaft bearings.

8. The turboshaft engine of claim 1, wherein the epicyclic gear train includes a sun gear fixed to rotate with the low speed spool, a plurality of intermediate gears in meshing engagement with the sun gear and the ring gear.

9. A turboshaft engine comprising:
    a high speed spool connecting a high pressure centrifugal compressor with a high pressure turbine;
    a low speed spool connecting a low pressure compressor with a low pressure turbine, wherein the low speed spool rotates around a central turboshaft engine rotational axis;
    an epicyclic gear train including an input fixed to rotate with the low spool, wherein the epicyclic gear train is a planet gear system and includes a ring gear is fixed from rotation relative to an engine static structure with a flexible support and a fixed gear ratio of between 2.5 to 4.0; and an output turboshaft fixed to rotate with a carrier of the epicyclic gear train, wherein the turboshaft engine includes a bypass ratio of zero, the output turboshaft rotates around a central output turboshaft rotational axis, the central output turboshaft rotational axis is centered and parallel with the central turboshaft engine rotational axis, and an outermost duct of the turboshaft engine is defined by a core airflow path.

10. The turboshaft engine of claim 9, wherein the low pressure compressor includes a pressure ratio of greater than 1.5 and less than 6.0 and the high pressure centrifugal compressor includes a pressure ratio of greater than 4.0 and less than 10.0.

11. The turboshaft engine of claim 9, wherein the low speed spool is supported by no more than two bearing systems and the high speed spool is supported by no more than two bearing systems.

12. The turboshaft engine of claim 9, wherein the low speed spool and the high speed spool are supported by at least four bearing systems and no more than ten bearing systems.

13. The turboshaft engine of claim 9, wherein an outmost duct of the turboshaft engine is defined by a core airflow path and the epicyclic gear train includes a sun gear fixed to rotate with the low speed spool, a plurality of intermediate gears in meshing engagement with the sun gear and the ring gear and the carrier supports the plurality of intermediate gears.

14. A method of operating a turboshaft engine comprising the steps of:

rotating a high speed spool including a high pressure centrifugal compressor and a high pressure turbine at between 48,000 rpms and 50,000 rpms;

rotating a low speed spool including a low pressure compressor and a low pressure turbine at 40,000 rpms around a central turboshaft engine rotational axis;

reducing a rotational speed of the low speed spool by a ratio of 1.5 to 4.0 with an epicyclic gear train, wherein an input of the epicyclic gear train is attached to the low speed spool and the turboshaft engine includes a bypass ratio of zero; and rotating an output turboshaft fixed to rotate with an output of the epicyclic gear train at a reduced rotational speed relative to the input, wherein the output turboshaft rotates around a central output turboshaft rotational axis, the central output turboshaft rotational axis is centered and parallel with the central turboshaft engine rotational axis, and an outermost duct of the turboshaft engine is defined by a core airflow path.

15. The method of claim 14, wherein the speed change mechanism is a star gear system and the output driveshaft fixed to a ring gear and a carrier is fixed from rotation relative to an engine static structure with a gear ratio of 1.5 to 2.5.

16. The method of claim 15, wherein the carrier is fixed from rotation relative to an engine static structure with a flexible support.

17. The method of claim 14, wherein the speed change mechanism is a planet gear system and the output driveshaft is fixed to carrier and a ring gear is fixed from rotation relative to an engine static structure with a gear ratio of 2.5 to 4.0.

18. The method of claim 17, wherein the ring gear is fixed from rotation relative to an engine static structure with a flexible support.

19. The method of claim 14, wherein the low pressure compressor includes a pressure ratio of greater than 1.5 and less than 6.0 and the high pressure centrifugal compressor includes a pressure ratio of greater than 4.0 and less than 10.0.

20. The method of claim 19, wherein an overall pressure ratio of the high pressure centrifugal compressor and the low pressure compressor is greater than 20 and less than 40.

* * * * *